April 21, 1942.   T. R. HARRISON   2,280,233
POWER SET FLOW METER
Filed Aug. 25, 1937   2 Sheets-Sheet 1
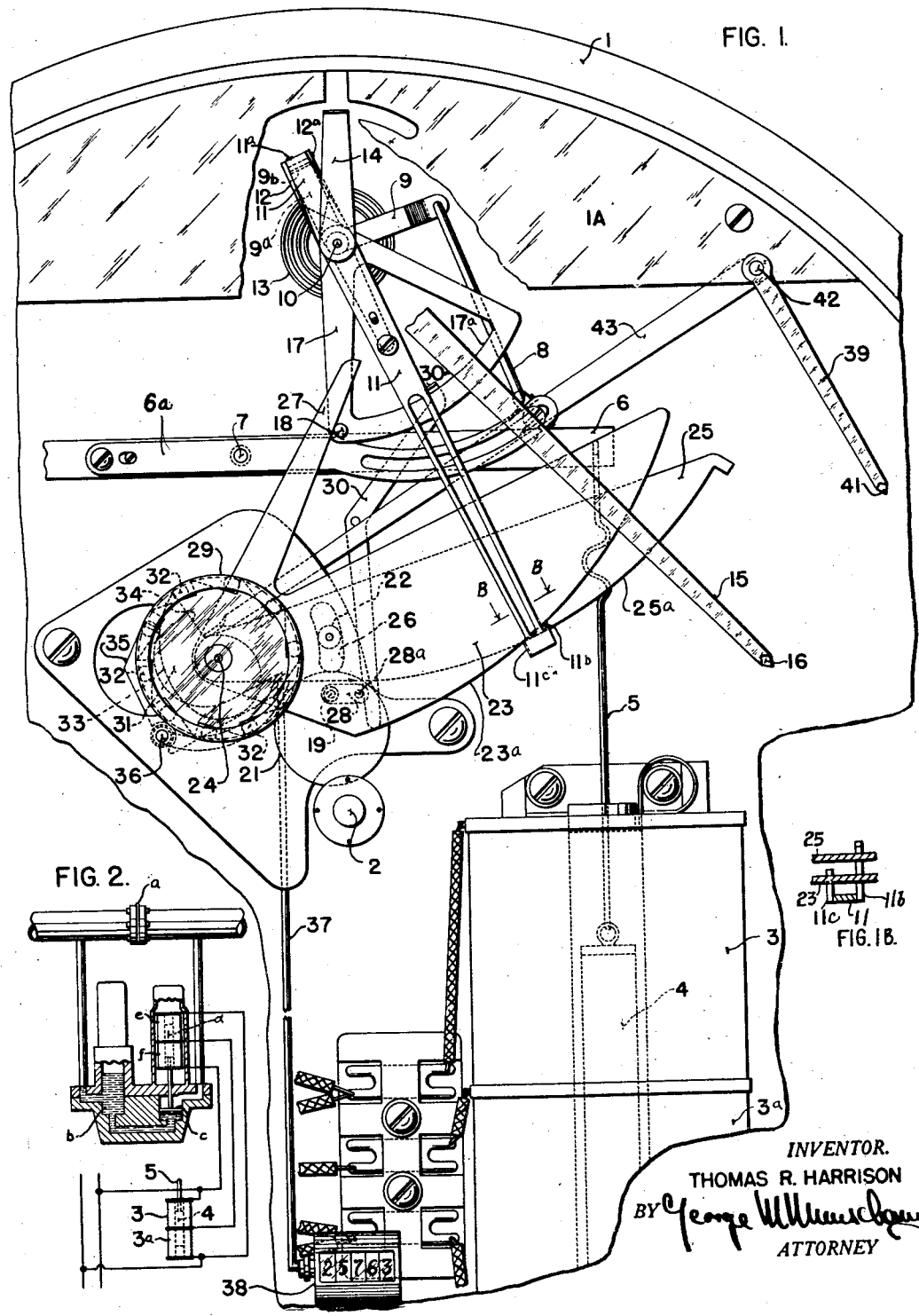
INVENTOR.
THOMAS R. HARRISON April 21, 1942.　　T. R. HARRISON　　2,280,233
POWER SET FLOW METER
Filed Aug. 25, 1937　　2 Sheets-Sheet 2
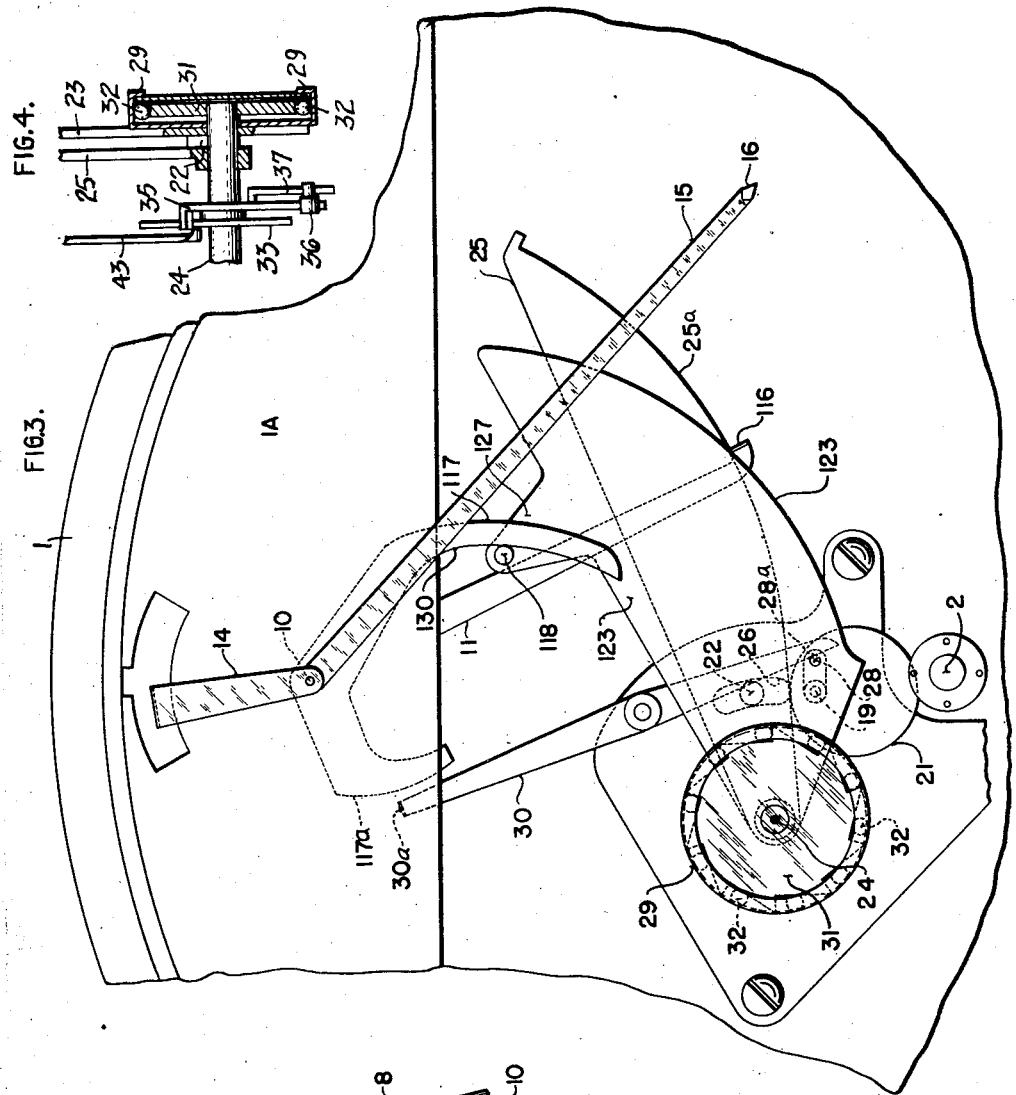
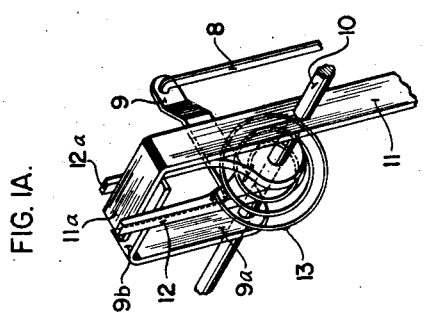
INVENTOR.
THOMAS R. HARRISON
BY George W. Murchamp
ATTORNEY Patented Apr. 21, 1942

2,280,233

UNITED STATES PATENT OFFICE 2,280,233

POWER SET FLOW METER

Thomas R. Harrison, Wyncote, Pa., assignor to The Brown Instrument Company, Philadelphia, Pa., a corporation of Pennsylvania Application August 25, 1937, Serial No. 160,742

13 Claims. (Cl. 234—2)

This invention relates to instrumentalities useful in the measuring and recording of variable conditions, and more particularly to mechanical relay instrumentalities for effecting adjustments under control of an element deflecting in accordance with the fluctuations of a variable condition such as flow.

In measuring the flow of a fluid, it is usual to employ, especially for transmitting at a distance, a relay such as an inductance bridge that is actuated by the differential pressures taken on opposite sides of an orifice plate inserted in the line through which the fluid is flowing. The power available at the receiving armature of an inductance bridge is sometimes insufficient for the desired purposes, when employed to actuate a recorder pen, control instrumentalities and/or scale conversion mechanism the load on the armature due to the friction on the pivots of the pen arm and the friction of the pen on the paper, and the weight of the parts is often excessive, impairing the accuracy of the device. It may be noted that the armature must also overcome the force of gravity on the pen arm when a circular chart is used.

It is a specific object of my invention to overcome the above noted objections by using the armature of an induction bridge to merely set a pointer and to use auxiliary power to move the final recording or control element in accordance with the setting of the pointer.

It is also an object of my invention to provide a power-set mechanism for actuating a recorder or control element in which the element is deflected in equal increments of movement for equal increases in the magnitude of a condition such as flow under control of a member deflecting in accordance with the condition and notwithstanding the non-linear movements of the latter with respect to the condition changes.

It is also an object of my invention to provide an integrator which will positively indicate and record the total flow during any desired interval of time. By incorporating such an integrator with the power-set mechanism referred to as a single unit, extreme accuracy is obtained and fewer moving parts are involved thereby minimizing inaccuracies and friction.

It is a particular object of my invention to make a recording and integrating meter that is simple and accurate in which a single unit is provided to both positively set the pen and actuate an integrator.

The various features of novelty which characterize my invention are pointed out with particularity in the claims annexed to and forming part of this specification. For a better understanding of the invention, however, and the advantages possessed by it, reference should be had to the accompanying drawings and description in which I have illustrated and described a preferred embodiment of the invention.

Fig. 1 of the drawings shows a front view of the mechanism with parts broken away for the sake of clearness;

Fig. 1A is a perspective view of certain parts shown in Fig. 1;

Fig. 1B is a view taken on lines B—B of Fig. 1;

Fig. 2 shows diagrammatically the connection between the meter of Fig. 1 and its actuating parts;

Fig. 3 illustrates a modification of the device of Figs. 1 and 2, and

Fig. 4 is a view partly in section of the clutch of Figs. 1 and 3 as seen from the left.

Although equally useful in connection with mechanical and other electrical types of flow metering systems, my invention is here illustrated as adapted for use in the Brown electric flow meter which is now in wide commercial use and which is disclosed in my prior Patent 1,743,852 granted January 14, 1930. In this system the differential pressure across an orifice $a$ inserted in the pipe line, of a fluid, the rate of flow of which is to be measured, is impressed upon the sealing liquid $b$ of a U-tube manometer, the level of the liquid in either leg of the manometer forming a measure of fluid rate of flow. A float $c$ in the liquid in one manometer leg rising and falling with the sealing liquid level carries an armature $d$ adapted to cooperate with inductance coils $e$, $f$ forming the transmitting element of a distant reading system. The distant reading system includes receiving coils $3$, $3a$ electrically connected to the transmitting coils $e$, $f$ and inductively related to a receiver armature $4$ which, as more fully described in my previously mentioned prior patent, is thereby given movements corresponding to the movements imparted to the armature $d$ by the manometer float.

In the modification of Fig. 1 the receiver coils $3$, $3a$ are included in a recorder-integrator instrument of circular form provided with a casing $I$ and a chart driving hub which is fixed to a shaft $2$ and is rotated at a constant speed by a motor (not shown) making a full revolution in any desired period of time, such as once in twenty-four hours. An upper segment plate $IA$ cooperates with a lower segment (not shown) to form a closure plate for the front of the instrument casing and to form a bearing plate for a chart which may be mounted on and rotated by the chart hub. The chart hub together with the recorder pens project through the closure plate and the mechanism now to be described is enclosed within the casing and in back of said plate. Armature 4 is connected by a link 5 to a lever 6, pivoted on stud 7. A member 6a which has a curved slot in its right end is attached to lever 6 for movement therewith and a link 8 is adjustably pivoted in this slot at one end, the other end of which is pivoted to a lever 9 which is in turn pivoted on shaft 10.

Lever 9 is made in the form of a bell-crank having an arm 9a provided with a transverse projection 9b parallel to and of the same width as projection 11a of lever 11, to be described below. Also loose on shaft 10 are arms 12, 12a each one of which is attached to the end of a spiral spring 13, the latter tending to move the arms 12, 12a toward each other and into engagement with the projections 9b and 11a which are thereby urged into alignment with each other by the action of the arms and the spring. This arrangement provides that lever 11 normally shares all movement of lever 9 but is permitted relative movement thereto when prevented from moving, as later described.

The shaft 10 is mounted for turning movement in the casing for rotation with a yoke 14 attached thereto which is formed with a pen arm 15 having a pen 16, adapted to indicate and/or record on a chart (not shown) the existing flow value. Also attached to shaft 10 for movement therewith is a quadrant or sector 17 which has on one of its corners a projecting pin 18 whose purpose will be later described. The quadrant, yoke, and pen arm are biased by gravity in a clockwise direction. It will be seen from the above described connections that every movement of the armature 4 will be accurately transmitted to the lever 11. Through the mechanism later described this movement of lever 11 is used to control movement of the quadrant and accordingly of the pen.

Journalled in the casing is a cam shaft 19 driven from the same motor that drives shaft 2, but at a much faster rate, say once every six seconds. Fastened to shaft 19 is member 28 having at its outer end pin 28a which contacts the lower end of a bell-crank lever 30, the upper end of which has a bent over projection 30a adapted to contact with a surface 17a on quadrant 17 to periodically prevent the quadrant and its associated yoke and pen arm from turning. Also fastened to shaft 19 is a cam or eccentric 21 serving to periodically raise roller 22 that is journalled on an integrating cam 23, pivoted on a shaft 24. Also pivoted on shaft 24 is a brake member 25, having a braking edge 25a arranged to engage an edge 11b of lever 11. Brake member 25 is normally biased in a clockwise direction by its own weight and a small spring (not shown) and has a fairly tight fit on shaft 24 so that any movement of the member will tend to move the shaft, but rotation of the shaft is not able to move the member 25 since its fit on shaft 24 is not tight enough to overcome the force of the spring and the weight of the member. Brake member 25 and cam 23 are provided with lower edges 25a and 23a respectively, which are arranged for respective contact with projections 11b and 11c formed at the lower end of lever 11.

The brake member 25 has an arcuate slot 26 surrounding roller 22, the upper end of which is adapted to be engaged at times by the roller. As cam 21 rotates, in a counter-clockwise direction from the position shown, its surface comes into contact with roller 22 to lift integrating cam 23 from its contact with edge 11c on lever 11. When, during this lifting movement, roller 22 reaches the top of slot 26, the brake member 25 is also lifted out of engagement with projection 11b, thus freeing lever 11 from any restraint. Lever 11 is therefore free to assume any position that is dictated by armature 4 through the above described connections. At the time the brake member is lifted enough to free edge 11b the cam 21 has rotated approximately 180° from the position shown in Fig. 1 and roller 22 is near the top of its stroke; continued rotation of cam 21 will therefore permit brake member 25 and integrating cam 23 to rotate in a clockwise direction under the influence of gravity until edge 25a strikes edge 11b and until the edge 23a strikes edge 11c, unless the latter engagement is prevented by prior engagement of integral arm 27 of cam 23 with the pin 18 of quadrant 17, the quadrant being at that time restrained from movement by lever 30.

From the above described operation it will be seen that the brake member 25 holds lever 11 in the position in which it is adjusted by armature 4 and holds it there until cam 23 has contacted with edge 11c. The relation of cam 21 and pin 28a is such that just as the high part of cam 21 reaches its lowermost position, pin 28a contacts lever 30 to move it and lift projection 30a from surface 17a so that quadrant 17 is free to turn into engagement with arm 27, if not already so engaged, in which case both cam 23 and quadrant 17 will be permitted to turn until cam 23 engages edge 11c. Contact between pin 28a and lever 30 is broken and the quadrant is again locked in place just prior to the time that cam 21 again contacts roller 22. The pen arm 15 is thus periodically released to take a new position and is held in that position until projection 30a is again lifted in the next cycle.

The operation is as follows: Cam 21 raises integrating cam 23 and brake member 25 to free lever 11 so that the latter assumes a position in accordance with the then condition of flow and then subsequently permits re-engagement of integrating cam 23 and brake member 25 with projections 11c and 11b, respectively. If in its clockwise movement, arm 27 of cam 23 contacts pin 18, the cam will be prevented from further turning until the cycle has progressed far enough for pin 18 to be released by the action of lever 30. When pin 18 is released the weight of the integrating cam 23 and arm 27 will be sufficient to force quadrant 17 and its associated pen arm counter-clockwise until edge 23a contacts edge 11c. In this manner the pen arm is set in accordance with the setting of lever 11 which is in turn positioned in accordance with the value of the flow. If, however, edge 23a comes to rest on edge 11c before arm 27 contacts pin 18 the pin, quadrant and pen arm when released will turn in a clockwise direction until arm 27 and pin 18 engage. Edge 17a is so shaped that when 30a is moved away from it the release will be gradual and the quadrant will start moving slowly to prevent a sudden jerk in the pen arm which would cause ink to be thrown from the pen onto its surroundings.

The differential pressure and therefore, the movement of the float $c$ in the manometer is a function of the square of the flow so the movement of lever 11 is the same. This necessitates the use of a chart with a square root scale on it when the pen arm is directly connected with the movement of armature 4. Such a chart, while having some uses, is often objectionable because of the fact that the graduations for equal increments of flow are unequal. In order to overcome this objection, the edge 23a of the integrating cam 23 is so curved that it in effect extracts the square root of the reading given by arm 11, and through arm 27 and pin 18 moves the pen arm equal distances for equal increments of flow, thus permitting the use of linear chart graduations.

The cam 23 is, as above explained, periodically raised to a fixed position once in each cycle of operation and thereafter is permitted to fall to a position determined by the then value of the flow, the variable travel of the cam being a measure of flow during that cycle. In order to integrate the successive excursions of cam 23, the latter is provided with counting mechanism including a clutch, here shown as a ball clutch. Rigidly attached to the integrating cam 23 is an outer section 29 of a one-way ball clutch, the inner section 31 of which is rigidly mounted on shaft 24. This inner section has the shape of a ratchet and mounted in between each pair of teeth is a ball 32. Upon counter-clockwise movement of the outer section 29 of the clutch, the balls 32 are cammed against the ratchet teeth of the inner section 31 and the inner section is thus rotated. Upon clockwise rotation of section 29 the inner section 31 does not rotate, since the balls are turned away from wedging engagement therewith and move back against the face of the next adjacent tooth. The friction on shaft 24 is sufficient to prevent it from rotating except by a positive force. Thus as the integrating cam 23 moves upwardly, or in a counter-clockwise direction, the shaft 24 is rotated, the amount of rotation depending upon the lowest position assumed by integrating cam 23 when it contacted edge 11c on arm 11.

It will be seen that at very low percentages of flow, that the oscillatory movement of cam 23 will be small, but some movement thereof is necessary even at zero flow in order that lever 11 may be freed to move to a new position. As cam 23 and brake 25 start their downward or clockwise movement, the shaft 24 and inner part 31 of the clutch are also moved until the brake 25 engages the edge 11b of arm 11. This reverse movement of the shaft 24 and clutch part 31 is due to the above mentioned tight fit of the brake member on the shaft. Therefore the counter-clockwise movement of part 31 after brake 25 starts to move is subtracted as the brake returns to its active position. The effective counter-clockwise or additive movement of clutch part 31 is therefore only that which it has between the time cam 23 starts to move and the time the brake 25 starts to move. Because of this arrangement the cam 23 may be lifted from the edge 11c, to free the lever 11, when the latter is in its zero position, without imparting a false movement to the shaft 24. This feature is of importance since it is a simple mechanism that provides accurate integration down to zero flow.

Also rigidly mounted on shaft 24 and back of the clutch parts is a counting cam 33 having a rising edge terminating in a radial surface 34. Bearing on the circumference of the counting cam 33 is one arm of bell-crank lever 35 which is pivoted at 36. This lever is normally biased in a clockwise direction by its own weight and that of link 37 attached thereto, although a spring may also be used to increase this biasing effect if desired. As the inner section of the clutch rotates it turns bell-crank 35 counter-clockwise until the arm of the bell-crank reaches radial surface 34. The bell-crank then moves clockwise under its own weight as above explained. The oscillatory movement of the bell-crank reciprocates a link 37 which is attached at its lower end to an ordinary form of counter 38 which is thereby actuated. The parts of the device are so proportioned that the movement of the integrating cam 23 when transmitted to the counter 38 will give an accurate integration of the flow of the measured fluid. For providing a chart record of the total or integrated amount of fluid measured during a given time, an arm 39 having pen 41 is provided. Arm 39 is fastened to shaft 42 to which is also fastened a lever 43. The other end of this lever bears on the surface of counting cam 33 so that as the cam rotates pen 41 is given a jog on the chart, one for each revolution of cam 33. The mark made by pen 41 will necessarily have to be a zig-zag one and counting the number of jogs on this line will give the total flow.

In the modification shown in Fig. 3 the same reference characters are used as were used in Fig. 1 for the same parts, although some of the apparatus shown in Fig. 1 has been omitted for the sake of clearness.

In this modification, the lever 11 is moved in accordance with changes in flow in a manner fully described in connection with Fig. 1, and the cam 21 rotates to periodically lift the integrating cam 123 and the brake 25 in a manner already disclosed.

Rigidly fastened to shaft 10 for movement therewith and with pen arm 15 is a curved lever 117 that has on the opposite side of shaft 10 a brake surface 117a, cooperating with projection 30a on brake lever 30. The lever 117 and pen arm 15 are biased in a clockwise direction by the action of gravity. This clockwise motion of the lever 117 is stopped by and in accordance with the position of pin 118 on the outer end of arm 127 formed integral with and on the upper surface of cam 123. This cam, as well as brake member 25, is pivoted for movement around shaft 24 and the cam has attached to it the outer section 29 of a ball clutch, the inner section 31 of which is attached to shaft 24 to actuate a counter in a manner shown in Fig. 1.

Surface 123a of cam 123 may be formed to have any desired configuration as long as it will cause the position of cam 123 to be a direct measurement of the position of lever 11 when edge 123a is in contact with edge 116 on the lower end of lever 11. This is desired so that as cam 123 moves to different positions it moves pin 118 into positions that are in direct proportion to the position of lever 11. In order to use a chart that has equal spacings for equal increments of flow, the edge 130 of lever 117 is so shaped that it, in effect extracts the square root of the reading given by lever 11 in the same manner edge 23a of lever 23 does in the modification shown in Fig. 1.

The operation of this modification is similar to that of Fig. 1. As cam 21 rotates, it lifts cam 123 and through the slot 26 and roller 22 lifts brake 25 to free lever 11 which thereupon assumes a position in accordance with the then value of the flow. Continued rotation of cam 21 will first let edge 25a contact edge 11b to lock lever 11 in place, and then permit edge 123a to contact the edge 11b. Immediately following this, pin 30a contacts lever 30 to move projection 30a from brake surface 117a, thus permitting pen arm 16, and lever 117 to move in a clockwise direction until edge 130 contacts pin 118 to set the pen. If, however, on its downward stroke, pin 118 contacts edge 130 before edge 123a contacts edge 116, then cam 123 will move no further until brake 30 releases lever 117. Upon the freeing of lever 117, the weight of cam 123 will, through contact of pin 118 and edge 130, force the pen arm and its connected parts in a counter-clockwise direction until edges 123a and 116 come into contact, thus setting the pen.

By the use of a very steep slope on the brake surface 117a the slow release of the brake will cause the member 117 to move slowly in a clockwise direction to the position it is to assume and thereby prevent any sudden movement of the pen which would tend to throw ink from it onto its surroundings.

In a manometer the movement of the float, such as d, is very small for low percentages of flow, particularly in the region of 10% of full scale and less. This in turn causes a very small movement of lever 11 which necessitates a rather steep curve at the lower end of edge 23a. This curve at times has to be formed so steep that there is danger of it camming lever 11 to the right (Fig. 1) when edges 23a and 11c contact and thereby cause both an incorrect setting of the pen and an incorrect integration of the total flow. In the construction of Figs. 1 and 2, this error maybe magnified by virtue of the relatively large ratio of the movement of the pen to the movement of the cam. This condition can be overcome by the construction of Fig. 3 in which the steepness of edge 123a for low flow readings is not so great as the steepness of edge 23a. This redesigning of edge 123a is possible since it only has the function of recording the readings of the lever 11, because the extraction of the square root of the readings to permit use of an evenly divided chart is done by edge 130 bearing on pen 118.

It is thus seen that due to the frequent measurements taken by integrating cams 23 and 123, and the positive manner that these measurements are transmitted to the counter, that the integrating is substantially continuous and is accurate within extremely narrow limits. The relative simplicity of the mechanism, and the arrangement of the parts such that lost motion and clearances are eliminated or are prevented from introducing errors, permit easy manufacturing of my device and contribute to its long life in practice with a minimum of maintenance.

It will also be seen that the pen is positively set by auxiliary power, thus relieving the inductance bridge relay from the necessity of moving anything but one light lever thereby increasing the accuracy of its settings.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a measuring apparatus, an exhibiting element movable about an axis, an arm moving with said element, means for moving said element and arm periodically, said means consisting of a member responsive to a condition to be measured, a cam for periodically contacting said member at different portions of the cam depending upon the position of the member, means to move said cam to a position free of said member and to permit it to move into contact with said member, a projection on said cam for engaging said arm to move the said arm and element in accordance with the position of the cam when it is contacting the member, and means to prevent only said arm and element from moving when they are not being moved by said projection.

2. In a measuring apparatus, a member deflectable in accordance with a variable condition, a shaped cam having a projection thereon oscillated about an axis into a position governed by said member, an element to be positioned in accordance with the position of said cam, a pivoted arm movable with said element, means separate from said cam for alternately clamping and releasing said arm, said projection engaging said arm to move said arm around its pivot in accordance with the governed position of said cam and thereby positioning said element, said projection moving the arm when the arm is unclamped.

3. In a flow meter, a pen arm, a projection movable with said pen arm, a pivoted member positioned by the instantaneous flow of the fluid being measured, a cam having a shaped edge and having an arm integral therewith, an eccentric for periodically moving said cam about an axis laterally displaced from the pivot of said member from a first position determined by said eccentric to a second position determined by contact between the shaped edge of said cam and member, said arm on the cam determining the position of said pen arm by contact between said cam arm and said projection when the cam is in its second position.

4. In a flow meter, a member positioned in accordance with the instantaneous value of the condition being measured, a pivoted cam for periodically contacting said member, an eccentric for moving said cam to a first position, said cam moving by gravity to a second position controlled by said member, a pivoted pen arm, an element mounted for movement therewith, said arm and element being biased for normal movement in one direction, a lever arm integral with said cam for moving said element and pen arm in the opposite direction, the connections being such that when the eccentric moves the cam and lever arm to the first position the pen arm and element can move in said one direction by their bias and when the cam and lever arm move to the second position the pen arm and element are thereby moved in said opposite direction.

5. In a flow meter, a pen arm, a counter, a member positioned in accordance with a condition to be measured, a cam moving between a first predetermined position and a second position determined by said member, means for actuating said counter from said cam as it moves from said second to said first position, and means for moving said pen arm from said cam as it moves from said first to said second position.

6. In a flow meter, a member movable in accordance with a condition to be measured, a cam movable to a position limited by contact with said member, a lever arm integral with said cam and a projection on said lever arm, a pen arm, a curved lever arm mounted for movement therewith, said pen arm and curved lever arm being biased in a given direction, movement in said direction being limited by contact between said curved lever arm and projection, whereby said pen arm is positioned in accordance with the position of said member.

7. In a flow meter, a pen arm, an element mounted for movement therewith, a brake surface on said element, the pen arm and element being biased for movement in a given direction, a brake for acting on said brake surface and means for releasing said brake whereby said pen arm and element may move under their bias, said brake surface being so shaped that as the brake releases and the element moves according to its bias the brake surface will move toward the brake whereby movement of the element will initially be slow.

8. In a flow meter, a member positioned in accordance with a function of a condition to be measured, a cam for contacting said member, an eccentric for moving said cam to a first position, said cam moving by gravity to a second position limited by contact with said member, the surface of said cam being so shaped that it extracts a root of said function, a pen arm, an element mounted for movement therewith, means for moving said pen arm and element from said cam whereby movement of said pen arm represents the extracted root of the function represented by said member.

9. In a flow meter a member positioned in accordance with a function of a condition to be measured, a cam for contacting said member, the contacting surface of the cam being so shaped that the cam is positioned in accordance with said function, a movable pen arm, a curved lever movable therewith, means for moving said curved lever by said cam, the shape of said curved lever being such that it extracts a root of the function represented by the position of said member and cam, whereby the position of said pen arm represents the extracted root of the function represented by said member.

10. In a flow meter, a pivoted pen arm, an element mounted for movement therewith, said element having a brake surface non-concentric with its pivot formed thereon, said pen arm and element being biased for movement in a given direction, means contacting said brake surface for preventing movement of said arm and element under their bias, means for releasing said contacting means, said brake surface being so shaped that when the contacting means releases the brake surface its initial movement will be slow.

11. In a meter, an adjustable lever, a cam with an arm thereon, an eccentric for moving said cam and arm to a first position, gravity moving said cam and arm to a second position determined by contact between said cam and said lever, an element biased for movement in one direction and adapted to be moved by said arm in the opposite direction as said arm moves toward its second position, a brake for said element to prevent said element and arm from moving in either direction, means for releasing said brake whereby said arm and cam can move to said second position and thereby move said element in said opposite direction, a counter, and means to actuate the counter as the element moving means moves from the second to the first position.

12. In a measuring instrument, the combination with a pivoted arm, a member having a brake surface thereon and a projection extending therefrom moving with said arm, a brake member engaging said brake surface, an element movable to a position proportional to the value of a measurable condition, an oscillatable cam member having a shaped edge, said cam being biased to move from a predetermined position to a position determined by engagement between said shaped edge and element, an arm on said cam adapted to engage said projection to thereby move said arm and member to a position corresponding to that of said element, and means to remove said brake from said brake surface to permit said member to be moved by said cam arm.

13. In a measuring instrument, a recording arm, a counter, an element movable to a position proportional to the value of a measurable condition, an oscillatable cam having a shaped edge adapted to engage said element, means to move said cam from a predetermined position to a position limited by its engagement with said element, an arm on said cam, means movable with said recording arm adapted to be engaged by the arm on said cam as the latter moves to move the recording arm, a clutch operated in one direction only by said cam as the latter oscillates, and means to actuate said counter from said clutch.

THOMAS R. HARRISON.